United States Patent
Suzuki (10) Patent No.: US 8,392,723 B2
(45) Date of Patent: Mar. 5, 2013

(54) INFORMATION PROCESSING APPARATUS AND COMPUTER READABLE MEDIUM FOR PREVENTING UNAUTHORIZED OPERATION OF A PROGRAM

(75) Inventor: Koji Suzuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1041 days.

(21) Appl. No.: 12/209,806

(22) Filed: Sep. 12, 2008

(65) Prior Publication Data

US 2009/0077388 A1 Mar. 19, 2009

(30) Foreign Application Priority Data

Sep. 19, 2007 (JP) ................................. 2007-242232

(51) Int. Cl.
*G06F 21/00* (2006.01)
(52) U.S. Cl. ............. 713/189; 713/155; 380/28; 380/44
(58) Field of Classification Search .................. 713/189, 713/155; 380/28, 44
See application file for complete search history.

(56) References Cited

U.S. PATENT DOCUMENTS

| | | | |
|---|---|---|---|
| 5,123,045 A | | 6/1992 | Ostrovsky et al. |
| 6,006,328 A | * | 12/1999 | Drake .............................. 726/23 |
| 6,079,021 A | * | 6/2000 | Abadi et al. ..................... 726/14 |
| 6,487,659 B1 | | 11/2002 | Kigo et al. |
| 6,742,122 B1 | * | 5/2004 | Morishita ..................... 713/189 |
| 7,925,886 B2 | * | 4/2011 | Lott .............................. 713/180 |
| 2006/0195703 A1 | * | 8/2006 | Jakubowski .................. 713/190 |
| 2006/0195886 A1 | * | 8/2006 | Ashley ........................... 725/138 |
| 2006/0257074 A1 | * | 11/2006 | Suzuki et al. .................... 385/49 |
| 2009/0235087 A1 | * | 9/2009 | Bird .............................. 713/190 |

FOREIGN PATENT DOCUMENTS

| | | |
|---|---|---|
| JP | A-11-231775 | 8/1999 |
| JP | A-2000-122861 | 4/2000 |
| JP | A-2004-364011 | 12/2004 |
| JP | A-2005-182509 | 7/2005 |
| JP | A-2007-48008 | 2/2007 |
| JP | A-2007-503038 | 2/2007 |
| WO | WO 2005/020068 A2 | 3/2005 |

OTHER PUBLICATIONS

Wee, Hoeteck, "On Obfuscating Point Functions," *STOC*, May 22-24, 2005.
Office Action issued on Nov. 17, 2009 in Japanese Patent Application No. 2007-242232 (with translation).

* cited by examiner

*Primary Examiner* — Harunur Rashid
(74) *Attorney, Agent, or Firm* — Oliff & Berridge, PLC (57) ABSTRACT

An information processing apparatus includes an information acceptance unit, a calculation unit and an encryption unit. The information acceptance unit accepts information relevant to a program. The calculation unit calculates one of a one-way function and a pseudo one-way function using one of the information relevant to the program accepted by the information acceptance unit and a part of the information. The encryption unit performs encryption processing for one of code of the program and the conversion result of the code and a part thereof using one of the calculation result of the calculation unit and a part of the result.

10 Claims, 7 Drawing Sheets

INFORMATION PROCESSING APPARATUS AND COMPUTER READABLE MEDIUM FOR PREVENTING UNAUTHORIZED OPERATION OF A PROGRAM

CROSS-REFERENCE TO RELATED APPLICATIONS

This application is based on and claims priority under 35 USC 119 from Japanese Patent Application No. 2007-242232 filed Sep. 19, 2007.

BACKGROUND

1. Technical Field

This invention relates to an information processing apparatus and a computer readable medium.

2. Related Art

A large number of software obfuscation technologies are proposed to protect a program from unauthorized reverse engineering. The obfuscation is a technology of converting a program into a complicated form for increasing the analysis cost of the program.

SUMMARY

According to an aspect of the invention, an information processing apparatus includes an information acceptance unit, a calculation unit and an encryption unit. The information acceptance unit accepts information relevant to a program. The calculation unit calculates one of a one-way function and a pseudo one-way function using one of the information relevant to the program accepted by the information acceptance unit and a part of the information. The encryption unit performs encryption processing for one of code of the program and the conversion result of the code and a part thereof using one of the calculation result of the calculation unit and a part of the result.

BRIEF DESCRIPTION OF THE DRAWINGS

Exemplary embodiment(s) of the present invention will be described in detail based on the following figures, wherein.

DETAILED DESCRIPTION

An exemplary embodiment of the invention relates to technologies of measures against illegal operation on a program, for example, prevention technology of unauthorized reverse engineering, obfuscation technology, anti-tamper technology, etc.

Referring now to the accompanying drawings, there are shown exemplary embodiments to embody the invention.

Figure 1:
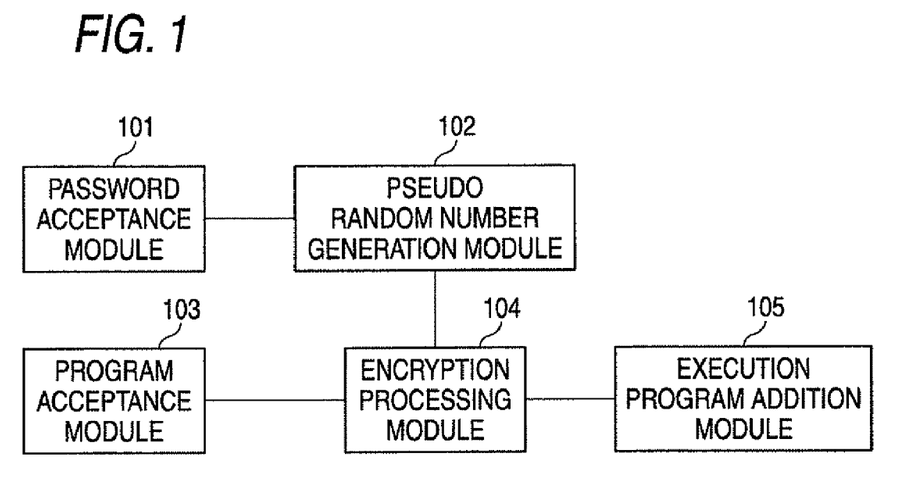
FIG. 1 is a conceptual module configuration drawing about a configuration example of first and second exemplary embodiments of the invention (obfuscation apparatus)

FIG. 1 is a conceptual module configuration drawing about a configuration example of an obfuscation apparatus of exemplary embodiments of the invention (first exemplary embodiment, second exemplary embodiment).

A module refers to a generally and logically detachable component of software (computer program), hardware, etc. Therefore, the module in the exemplary embodiments unit not only a module in a computer program, but also a module in the hardware configuration. Therefore, the exemplary embodiments also serve as the description of a computer program, a system, and a method. For the convenience of the description, "store", "cause to store" and its equivalent word are used, however, if the exemplary embodiment is a computer program, the words are used to mean storing in storage or controlling so as to store in storage. Modules are almost in a one-to-one correspondence with functions; however, in implementation, one module may be one program or two or more modules may make up one program or two or more programs may make up one module. Two or more modules may be executed by one computer or one module may be executed in two or more computers in a distributed or parallel environment. One module may contain any other module. In the description to follow, the term "connection" contains not only physical connection, but also logical connection (data transfer, command, reference relationship between data pieces, etc.,).

The system or apparatus is not only provided by connecting a plurality of computers, hardware devices, units, etc., by communication unit such as a network (containing peer-to-peer communication connection), etc., but also implemented as one computer, hardware device, apparatus, etc.

In the description that follows, a password is mainly illustrated as information relevant to a program.

An obfuscation apparatus performs obfuscation processing for a program and has a password acceptance module 101, a pseudo random number generation module 102, a program acceptance module 103, an encryption processing module 104, and an execution program addition module 105 as shown in FIG. 1.

The password acceptance module 101 is connected to the pseudo random number generation module 102 and accepts a password and passes the password to the pseudo random number generation module 102.

The pseudo random number generation module 102 is connected to the password acceptance module 101 and the encryption processing module 104 and uses the password accepted by the password acceptance module 101 or a part of the password to calculate a one-way function or a pseudo one-way function, and passes the result to the encryption processing module 104.

The calculation of a one-way function or a pseudo one-way function performed by the pseudo random number generation module 102 can be combined as calculation of a one-way function using a password, calculation of a one-way function using a part of a password, calculation of a pseudo one-way function using a password, calculation of a pseudo one-way function using a part of a password.

The program acceptance module 103 is connected to the encryption processing module 104 and accepts a program to which obfuscation processing applies and passes the program to the encryption processing module 104.

The encryption processing module 104 is connected to the pseudo random number generation module 102, the program acceptance module 103, and the execution program addition module 105. The encryption processing module 104 uses the calculation result of the pseudo random number generation module 102 or a part of the result to perform encryption processing for code of the program accepted by the program acceptance module 103 or the conversion result of the code or a part therefor and passes the program undergoing the encryption processing (obfuscation processing) to the execution program addition module 105.

The encryption processing performed by the encryption processing module 104 can be combined as encryption processing for program code using the calculation result, encryption processing for program code using a part of the calculation result, encryption processing for the conversion result of program code using the calculation result, encryption processing for the conversion result of program code using a part of the calculation result, encryption processing for a part of program code using the calculation result, encryption processing for a part of program code using a part of the calculation result, encryption processing for a part of the conversion result of program code using the calculation result, encryption processing for a part of the conversion result of program code using a part of the calculation result.

The program to which obfuscation processing applies is a source code program. The execution program addition module 105 is connected to the encryption processing module 104 and executes the program code encrypted by the encryption processing module 104 or the conversion result of the code or a part thereof.

Program execution of the execution program addition module 105 can be combined as program execution of code, program execution of the conversion result of code, program execution of a part of code, program execution of a part of the conversion result of code.

Figure 2:
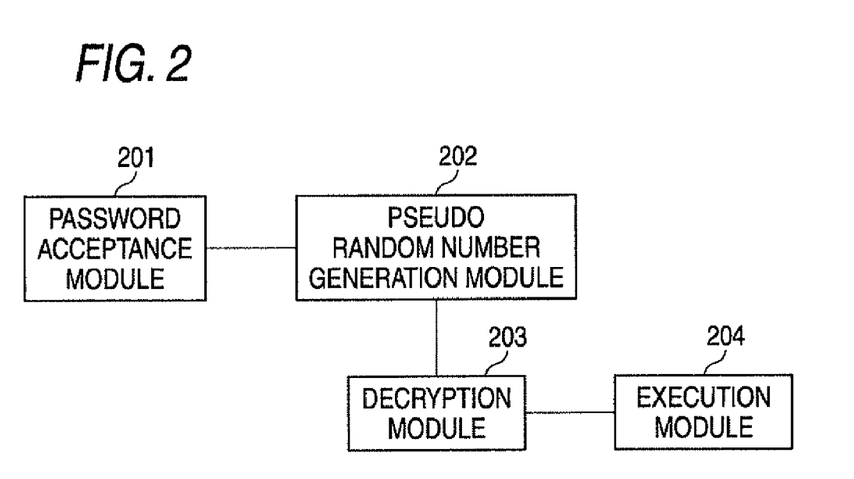
FIG. 2 is a conceptual module configuration drawing about a configuration example of the first and second exemplary embodiments of the invention (execution processing apparatus)

FIG. 2 is a conceptual module configuration drawing about a configuration example of an execution processing apparatus of the exemplary embodiments of the invention (first exemplary embodiment, second exemplary embodiment).

The execution processing apparatus interprets the program subjected to the obfuscation processing and performs execution processing. It has a password acceptance module 201, a pseudo random number generation module 202, a decryption module 203, and an execution module 204 as shown in FIG. 2.

The password acceptance module 201 is connected to the pseudo random number generation module 202 and accepts a password and passes the password to the pseudo random number generation module 202.

The pseudo random number generation module 202 is connected to the password acceptance module 201 and the decryption module 203 and uses the password accepted by the password acceptance module 201 or a part of the password to calculate a one-way function or a pseudo one-way function, and passes the result to the decryption module 203.

The calculation of a one-way function or a pseudo one-way function performed by the pseudo random number generation module 202 can be combined as calculation of a one-way function using a password, calculation of a one-way function using a part of a password, calculation of a pseudo one-way function using a password, calculation of a pseudo one-way function using a part of a password.

The decryption module 203 is connected to the pseudo random number generation module 202 and the execution module 204 and uses the calculation result of the pseudo random number generation module 202 or a part of the result to decrypt the encrypted program code or the conversion result of the code or a part thereof, and passes the decryption result to the execution module 204.

The decryption performed by the decryption module 203 can be combined as decryption of encrypted program code using the calculation result, decryption of encrypted program code using a part of the calculation result, decryption of the conversion result of encrypted program code using the calculation result, decryption of the conversion result of encrypted program code using a part of the calculation result, decryption of a part of encrypted program code using the calculation result, decryption of a part of encrypted program code using a part of the calculation result, decryption of a part of the conversion result of encrypted program code using the calculation result, decryption of a part of the conversion result of encrypted program code using a part of the calculation result.

The program decrypted by the decryption module 203 is a source code program. The execution module 204 is connected to the decryption module 203 and executes the program code decrypted by the decryption module 203 or the conversion result of the code or a part thereof.

Execution of the execution module 204 can be combined as execution of decrypted program code, execution of the conversion result of decrypted program code, execution of a part of decrypted program code, execution of a part of the conversion result of decrypted program code.

In the first exemplary embodiment, to sell software on a chargeable basis, the case where obfuscation processing is performed for the software for sale for the purpose of preventing an unauthorized user paying no value from illegally using the software, for example, will be discussed.

Next, the use mode of an obfuscation apparatus 12 of the first exemplary embodiment will be discussed based on FIG. 3.

Figure 3:
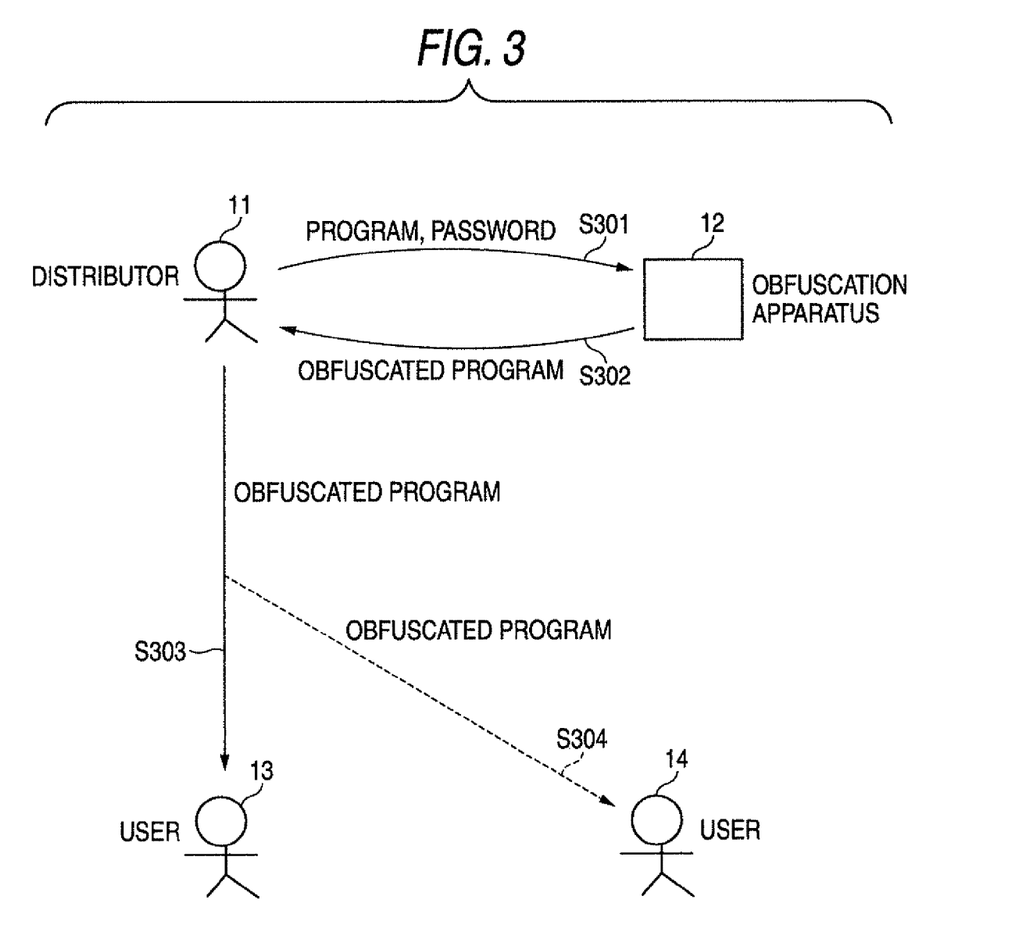
FIG. 3 is a schematic representation to show a use mode example of the obfuscation apparatus in the first exemplary embodiment of the invention.

In FIG. 3, a distributor 11 is a distributor of a program and users 13 and 14 are users of the program. The distributor 11 and the users 13 and 14 have each a personal computer (PC) for creating, distributing, receiving, and executing the program and the processing described below is executed by the obfuscation apparatus 12 or the PC of the distributor 11, etc.

The arrow represents transfer of data and a program. This means that the data or the program indicated by the arrow is passed from the start point of the arrow to the end point.

It is assumed that the obfuscation apparatus 12 is used by the program distributor 11. The distributor 11 inputs the software program provided for the use of the user and a password described later to the obfuscation apparatus 12 (S301). It is assumed that the program is described in the text format using a high-level language such as Java (registered trademark) That is, the program is source code and an execution environment in which interpreter programming language, namely, program source code is translated so that the computer can execute the program in succession and instructions are executed in succession is applied.

The obfuscation apparatus 12 performs obfuscation processing for the received program and outputs an obfuscated program (S302). The obfuscation apparatus 12 converts the input program so that the function and output of the obfuscated program do not change from those of the input program. However, the code of the obfuscated program is subjected to encryption processing and thus it is difficult to analyze the program code to obtain confidential information of the program.

For the purpose of selling the program, the distributor 11 distributes the obfuscated program to the authorized user 13 at a remote location via the Internet (S303). The distributor 11 and the user 13 share a 128-bit pseudo random number required for starting the software for sale as a secret password from a third party.

To attempt unauthorized use of the program, the user 14 obtains the program by fraud by illegal hacking, etc., on the path to distribute the program from the distributor 11 to the authorized user 13 (S304).

Next, a procedure of obfuscation executed by the obfuscation apparatus 12 will be discussed.

The obfuscation apparatus 12 inputs the program given by the distributor 11 and a password w shared between the distributor 11 and the authorized user 13 and outputs an obfuscated program corresponding to the program.

The first exemplary embodiment assumes that the pre-obfuscated program input to the obfuscation apparatus 12 is described using a high-level language such as Java. The file size of the program is u bits (u>0) and file data of the program is represented as P.

Figure 4:
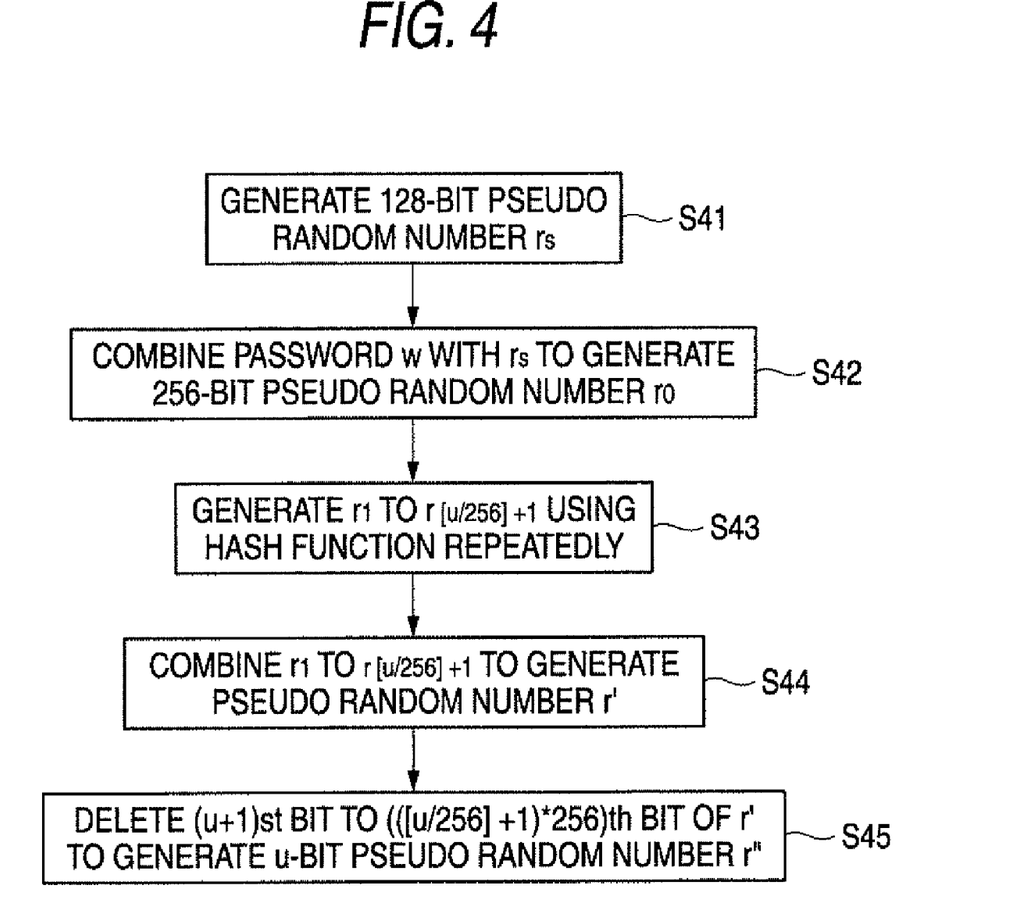
FIG. 4 is a flowchart to show a generation procedure example of a pseudo random number.

The obfuscation apparatus 12 receives 256-bit input according to a procedure shown in FIG. 4, repeatedly uses a hash function for outputting a 256-bit pseudo random number, and generates a 256-bit pseudo random number $R_0$ relevant to the password and a u-bit pseudo random number $R_1$. SHA-256, etc., is known as the hash function as described above.

To begin with, at step S41, the obfuscation apparatus 12 generates a 128-bit pseudo random number $r_s$ using a technique of linear code, etc., for example.

Next, at step S42, the obfuscation apparatus 12 combines the password with $r_s$ to generate a 256-bit pseudo random number $r_0$.

Further, at step S43, the obfuscation apparatus 12 generates [u/256]+2 pseudo random numbers using the following procedure: First, output of the hash function when $r_0$ is input is $r_1$. Further, output of the hash function when $r_1$ is input is $r_2$ and likewise, output of the hash function when $r_i$ is input is $r_{i+1}$. This operation is repeated until generation of $r_{[u/256]+2}$. Here, for a positive number x, the symbol of [x] represents a positive integer smaller than x and most close to x.

Next, at step S44, the obfuscation apparatus 12 combines $r_1$ to $r_{[u/256]+1}$ to generate a ([u/256]+1)*256-bit pseudo random number r'.

Further, at step S45, the obfuscation apparatus 12 deletes the (u+1)st bit to the (([u/256]+1)*256)th bit of r' to generate a u-bit pseudo random number $R_1$. Further, the obfuscation apparatus 12 sets the pseudo random number $r_{[u/256]+2}$ to $R_0$.

Figure 5:
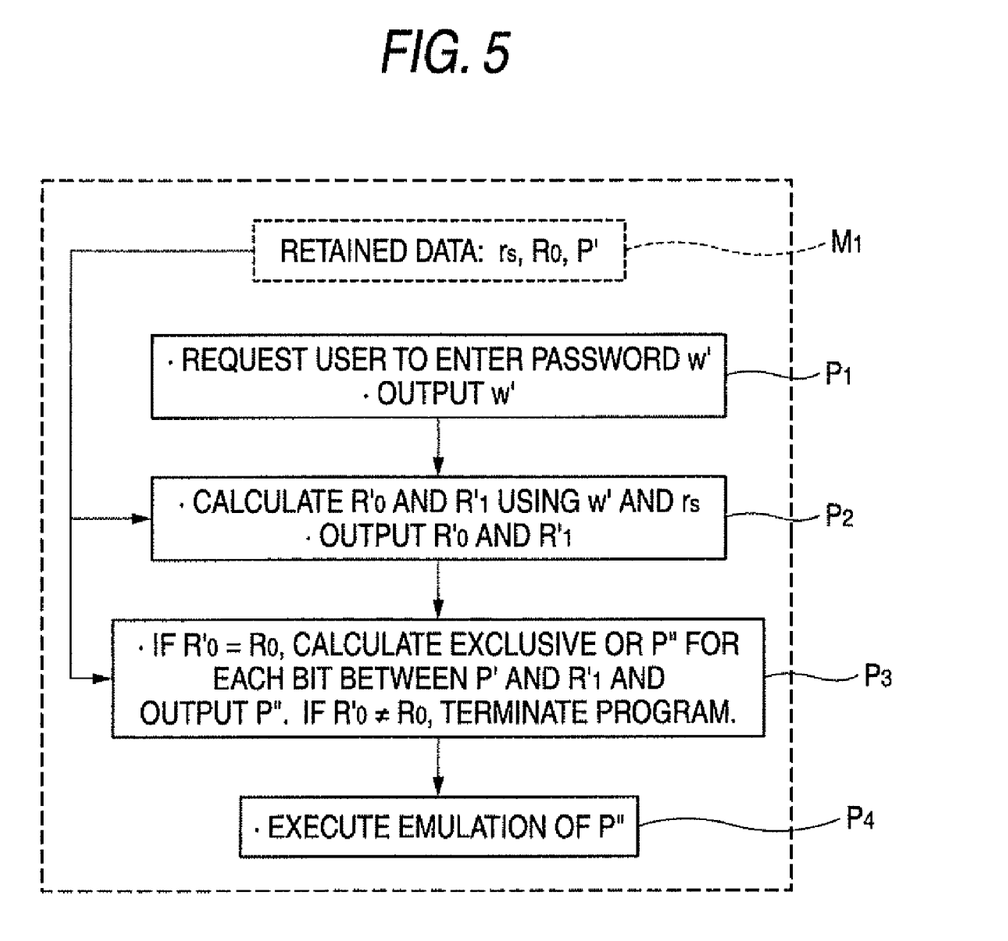
FIG. 5 is a schematic representation to show a configuration example of an obfuscated program in the first exemplary embodiment of the invention.

Next, the obfuscation apparatus 12 generates an obfuscated program $P_{ob}$ from the file data P of the original program according to the following procedure:

The configuration of the obfuscated program $P_{ob}$ generated by the obfuscation apparatus 12 complies with FIG. 5.

First, the obfuscation apparatus 12 calculates exclusive OR P' for each bit between the file data P of the input program and $R_1$. The obfuscated program $P_{ob}$ retains $r_s$, $R_0$, and P' in a data storage section $M_1$ in the program and further retains subroutine programs $p_1$ to $p_4$ described below in the program.

The arrow in FIG. 5 shows transfer of data from the start point to the end point between the data storage section and the subroutine programs.

The subroutine program $p_1$ is a program for requesting the user to enter a password w' and outputting entered w'.

The subroutine program $p_2$ is a program for receiving w' from the program $p_1$ and generating a 256-bit pseudo random number $R'_0$ and a u-bit pseudo random number $R'_1$ according to the same procedure as calculating of $R_0$ and $R_1$ using the pseudo random number $r_s$ and the password w' stored in the obfuscated program $P_{ob}$.

The subroutine program $p_3$ is a program for receiving the pseudo random numbers $R'_0$ and $R'_1$ from the program $p_2$ and making a comparison between $R'_0$ and $R_0$ retained in the data storage section and then if $R'_0=R_0$, calculating and outputting exclusive OR P''' for each bit between $R'_1$ and P' retained in the data storage section and if $R'_0 \neq R_0$, terminating execution of the obfuscated program $P_{ob}$.

The subroutine program $p_4$ is a program for receiving P''' from the program $p_3$ and executing emulation with the character string given by P''' as an input program.

The obfuscation apparatus 12 creates the subroutine programs $p_1$ to $p_4$ in order and then combines the subroutine programs and further adds the data storage section $M_1$ retaining $r_s$, $R_0$, and P' to create the obfuscated program $P_{ob}$.

The program distributor 11 distributes the obfuscated program $P_{ob}$ output by the obfuscation apparatus 12 to the user 13 via the Internet.

The user 13 downloads the received obfuscated program $P_{ob}$ to the PC of the user 13 and executes the program.

The executed obfuscated program $P_{ob}$ executes the internally retained subroutine programs $p_1$ to $p_4$ in order.

First, the user 13 is requested to enter a password, and a 256-bit pseudo random number $R'_0$ and a u-bit pseudo random number $R'_1$ are calculated according to the same procedure as described above using the entered password and the pseudo random number $r_s$ stored in the program.

Next, if $R'_0=R_0$, exclusive OR P''' for each bit between P' and $R'_1$ is calculated and then emulation is executed with the character string represented by P''' as an input program. If $R'_0 \neq R_0$, execution of the obfuscated program $P_{ob}$ is terminated.

If the password received from the user 13 matches w, the original file data P is correctly decrypted and the obfuscated program $P_{ob}$ executes the same calculation as the original program because of the nature of the exclusive OR. If the password does not match w, the obfuscated program $P_{ob}$ stops the execution in progress and does not present output desired by the user.

Thus, if the user 14 obtains the program by fraud using illegal hacking, etc., from the distribution path, the user 14 who does not have the valid password cannot operate the program normally.

In the first exemplary embodiment described above, the password shared between the distributor 11 of the program and the user 13 is used to start the obfuscated program $P_{ob}$, but information required for starting the obfuscated program $P_{ob}$ need not necessarily be limited to the password. For example, an electronic ticket system, an access right management program installed in the PC of the user 13, or the like may be used to pass secret information to the obfuscated program $P_{ob}$.

In the first exemplary embodiment described above, the original program is encrypted and decrypted using the exclusive OR for each bit, but the method of encrypting and decrypting the program is not necessarily limited to it. For example, the original program may be divided into blocks each having a size of 256 bits and the blocks may be encrypted using RSA encryption, etc., with pseudo random numbers $r_1$ to $r_{[u/256]+1}$ as keys in order.

Further, in the first exemplary embodiment described above, when a pseudo random number is generated, the one-way hash function is used, but the method of generating a pseudo random number is not necessarily limited to it. For example, a pseudo random number may be generated using permutation having one way or pseudo one way. A method described in document [H.Wee, ACM/STOC, 2005], etc., is known as a method of forming permutation having one way or pseudo one way.

In the first exemplary embodiment described above, the program to be encrypted and decrypted is described in the text format, but the exemplary embodiment is not necessarily limited to the mode. For example, the program may be coded based on the Godel number and may be encrypted and decrypted. In this case, to execute the obfuscated program, first the encrypted integer code is decrypted and further the decrypted integer is converted into a program format and then emulation is executed. For example, program code may be converted into a different code system from the program code system and the code may be encrypted and decrypted.

To distribute the program to the user 13, the Internet need not necessarily be used. For example, an electronic medium of a COD-ROM, etc., or a satellite communications system may be used to distribute the program.

In the first exemplary embodiment described above, the original program is described in the text format using a high-level language such as Java and an emulator is used to execute the decrypted program, but the program description method and the execution method of the decrypted program are not necessarily limited to them. For example, for the purpose of decreasing overhead of the processing time, the program may be given in an execute form after compiled and encryption and decryption processing for obfuscation may be executed for the program in the execute form for circumventing the use of the emulator.

In the first exemplary embodiment described above, the obfuscation processing is performed for the whole of the program. However, for example, to decrease overhead of the processing time and an increase in the file size caused by the obfuscation, the obfuscation processing may be performed only for a part of the program.

A second exemplary embodiment of the invention will be discussed with FIGS. 6 and 7. The second exemplary embodiment relates to an obfuscation apparatus different from that of the first exemplary embodiment.

Figure 6:
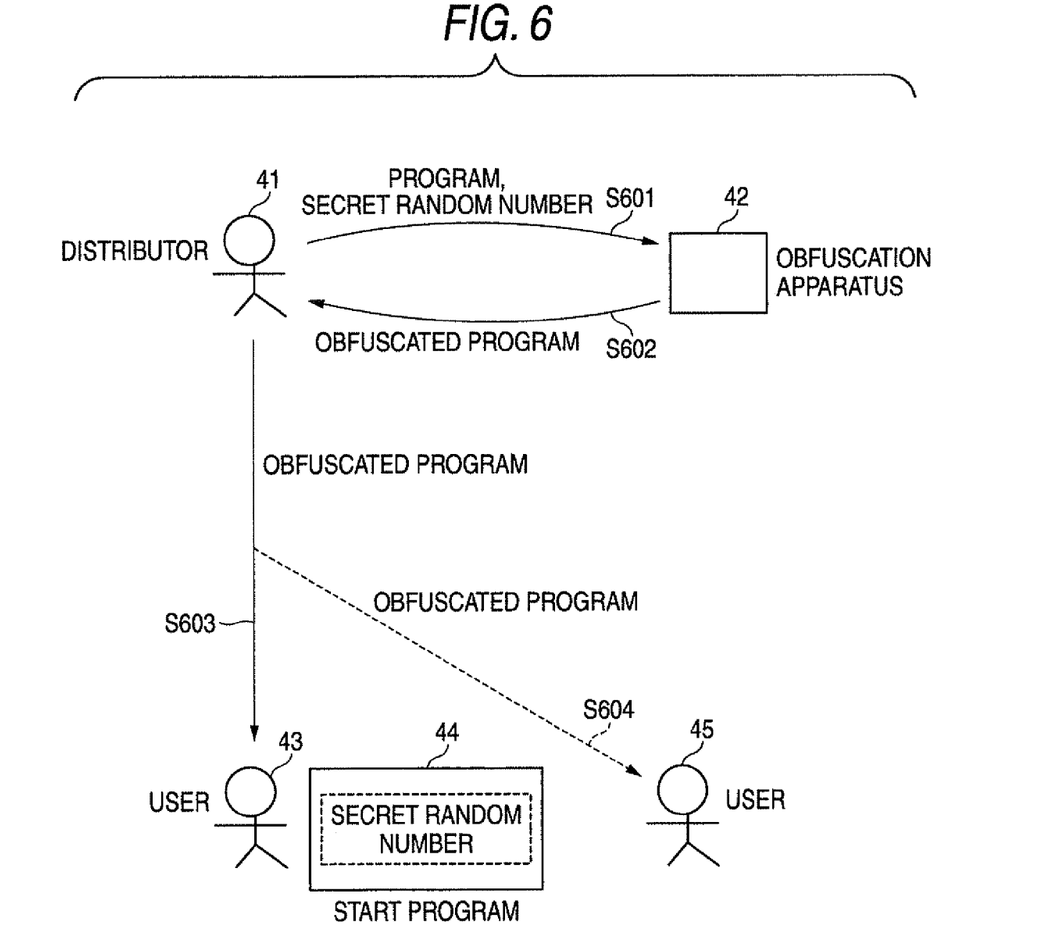
FIG. 6 is a schematic representation to show a use mode example of the obfuscation apparatus in the second exemplary embodiment of the invention.

The basic use mode of an obfuscation apparatus 42 in the second exemplary embodiment complies with FIG. 6. In the second exemplary embodiment, like the first exemplary embodiment, to sell software on a chargeable basis, the case where obfuscation processing is performed for the software for sale for the purpose of preventing an unauthorized user paying no value from illegally using the software, for example, will be discussed.

In the second exemplary embodiment, unlike the first exemplary embodiment, encryption and decryption processing for obfuscation is realized using symmetric key cryptography of AES, etc.

In FIG. 6, a distributor 41 is a distributor of a program and users 43 and 45 are users of the program. The obfuscation apparatus 42 is used by the distributor 41 and a start program 44 is used by the user 43. The distributor 41 and the users 43 and 45 have each a personal computer (PC) for creating, distributing, receiving, and executing the program and the processing described below is executed by the obfuscation apparatus 42 or the PC of the distributor 41, etc.

The arrow represents transfer of data and a program. This means that the data or the program indicated by the arrow is passed from the start point of the arrow to the end point.

It is assumed that the obfuscation apparatus 42 is used by the program distributor 41. The distributor 41 inputs the software program provided for the use of the user and a secret random number $W_R$ described later to the obfuscation apparatus 42 (S601). It is assumed that the program is described in the text format using a high-level language such as Java.

The obfuscation apparatus 42 performs obfuscation processing for the received program and outputs an obfuscated program (S602).

The obfuscation apparatus 42 converts the input program so that the function and output of the obfuscated program do not change from those of the input program. However, the code of the obfuscated program is subjected to encryption processing and thus it is difficult to analyze the program code to obtain confidential information of the program.

For the purpose of selling the program, the distributor 41 distributes the obfuscated program to the authorized user 43 at a remote location via the Internet (S603).

It is assumed that the distributor 41 previously distributes the start program 44 for starting the obfuscated program to the authorized user 43. The start program 44 internally retains the secret random number $W_R$ required for starting the obfuscated program. The authorized user 43 has the start program 44 and previously installs the start program 44 in his or her PC. To attempt unauthorized use of the program, the user 14 who does not have the start program 44 obtains the program by fraud by hacking, etc., on the path to distribute the program from the distributor 41 to the authorized user 43 (S604).

Next, a procedure of obfuscation executed by the obfuscation apparatus 42 will be discussed.

The obfuscation apparatus 42 inputs the program given by the distributor 41 and the secret random number $W_R$ and outputs an obfuscated program corresponding to the program. Like the first exemplary embodiment, the second exemplary embodiment assumes that the pre-obfuscated program input to the obfuscation apparatus 42 is described using a high-level language such as Java. As in the first exemplary embodiment, the file size of the program is u bits (u>0) and file data of the program is represented as P.

The obfuscation apparatus 42 receives 256-bit input, uses a hash function for outputting a 256-bit pseudo random number, and generates two 128-bit pseudo random numbers $R_0$ and $R_1$ relevant to the secret random number $W_R$. SHA-256, etc., is known as the hash function as described above.

The obfuscation apparatus 42 generates a 428-bit pseudo random number $r_s$ using a technique of linear code, etc., for example. Next, the obfuscation apparatus 42 combines the secret random number $W_R$ with $r_s$ to generate a 256-bit pseudo random number $r_0$. Further, output of the hash function when $r_0$ is input is $r_1$ and the first half 128 bits of the pseudo random number $r_1$ are set to $R_0$ and the latter half 128 bits are set to $R_1$.

Figure 7:
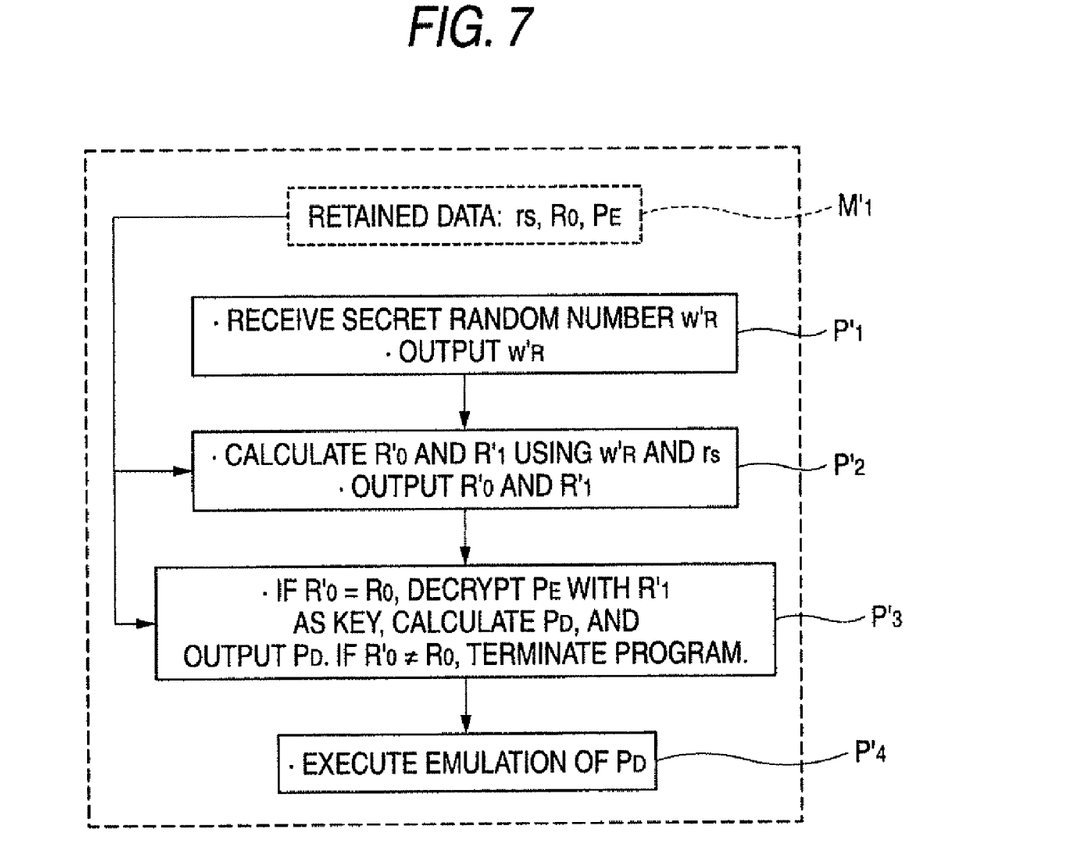
FIG. 7 is a schematic representation to show a configuration example of an obfuscated program in the second exemplary embodiment of the invention.

Next, the obfuscation apparatus 42 of the second exemplary embodiment generates an obfuscated program $P'_{ob}$ from the file data P of the original program according to the following procedure:

The configuration of the obfuscated program generated by the obfuscation apparatus 42 complies with FIG. 7.

First, the obfuscation apparatus 42 encrypts the file data P of the program according to AES with $R_1$ as a common key. The data generated by the encryption is represented as $P_E$.

The obfuscated program $P'_{ob}$ retains $r_s$, $R_0$, and $P_E$ in a data storage section $M'_1$ in the program and retains subroutine programs $p'_1$ to $p'_4$ described below in the program.

The arrow in FIG. 7 shows transfer of data from the start point to the end point between the data storage section $M'_1$ and the subroutine programs.

The subroutine program $p'_1$ is a program for communicating with the start program and making a request for inputting a secret random number $W'_R$ and outputting input $W'_R$.

The subroutine program $p'_2$ is a program for receiving $W'_R$ from the program $p'_1$ and generating 128-bit pseudo random numbers $R'_0$ and $R'_1$ according to the same procedure as described above using the pseudo random number $r_s$ and the password $W'_R$ stored in the obfuscated program $P'_{ob}$.

The subroutine program $p'_3$ is a program for receiving the pseudo random numbers $R'_0$ and $R'_1$ from the program $p'_2$ and making a comparison between $R'_0$ and $R_0$ retained in the data storage section and then if $R'_0=R_0$, decrypting the encrypted data $P_E$ retained in the data storage section using AES with $R'_1$ as a key and outputting data $P_D$ and if $R'_0 \ne R_0$, terminating execution of the obfuscated program $P'_{ob}$.

The subroutine program $p'_4$ is a program for receiving $P_D$ from the program $p'_3$ and executing emulation with the character string given by $P_D$ as an input program.

The obfuscation apparatus 42 creates the subroutine programs $p'_1$ to $p'_4$ in order and then combines the subroutine programs and further adds the data storage section $M'_1$ retaining $r_s$, $R_0$, and $P_E$ to create the obfuscated program $P'_{ob}$.

The program distributor 41 distributes the obfuscated program $P'_{ob}$ output by the obfuscation apparatus 42 to the user 43 via the Internet.

The user 43 downloads the received obfuscated program $P'_{ob}$ to the PC of the user 43.

To execute the obfuscated program $P'_{ob}$, first the user 43 executes the start program 44. The executed start program 44 starts the obfuscated program $P'_{ob}$. The started obfuscated program $P'_{ob}$ executes the internally retained subroutine programs $p'_1$ to $p'_4$ in order.

First, the start program 44 is requested to input a secret random number, and 128-bit pseudo random numbers $R'_0$ and $R'_1$ are calculated according to the same procedure as described above using the input secret random number and the pseudo random number $r_s$ stored in the program.

Next, if $R'_0=R_0$, the encrypted data $P_E$ is decrypted using AES with $R'_1$ as a key to generate data $P_D$ and then emulation is executed with the character string given by $P_D$ as an input program. If $R'_0 \ne R_0$, execution of the obfuscated program $P'_{ob}$ is terminated.

If the secret random number received from the start program 44 matches $W_R$, the original file data $P$ is correctly decrypted and the obfuscated program $P'_{ob}$ executes the same calculation as the original program because of the nature of the exclusive OR.

If the secret random number does not match $W_R$, the obfuscated program $P'_{ob}$ stops the execution in progress and does not present output desired by the user 45. Thus, if the user 45 obtains the program by fraud using illegal hacking, etc., from the distribution path, the user 45 who does not have the start program 44 cannot operate the program normally.

In the second exemplary embodiment described above, the secret random number retained by the start program 44 is used to start the obfuscated program $P'_{ob}$, but information required for starting the obfuscated program $P'_{ob}$ need not necessarily be limited to the password. For example, an electronic ticket system, an access right management program installed in the PC of the user, or the like may be used to pass secret information to the obfuscated program $P'_{ob}$.

In the second exemplary embodiment described above, when a pseudo random number is generated, the hash function is used, but the method of generating a pseudo random number is not necessarily limited to it. For example, a pseudo random number may be generated using permutation having one way or pseudo one way. A method described in document [H. Wee, ACM/STOC, 2005], etc., is known as a method of forming permutation having one way or pseudo one way.

Further, in the second exemplary embodiment described above, encryption and decryption are realized using AES, but the realizing method of encryption and decryption is not limited to it. For example, an encryption system of DES, FEAL, etc., may be used.

In the second exemplary embodiment described above, the program to be encrypted and decrypted is described in the text format, but the exemplary embodiment is not necessarily limited to the mode. For example, the program may be coded based on the Godel number and may be encrypted and decrypted. In this case, to execute the obfuscated program, first the encrypted integer code is decrypted and further the decrypted integer is converted into a program format and then emulation is executed. For example, program code may be converted into a different code system from the program code system and the code may be encrypted and decrypted.

To distribute the program to the user 43, the Internet need not necessarily be used. For example, an electronic medium of a CD-ROM, etc., or a satellite communications system may be used to distribute the program.

In the second exemplary embodiment described above, the original program is described in the text format using a high-level language such as Java and an emulator is used to execute the decrypted program, but the program description method and the execution method of the decrypted program are not necessarily limited to them. For example, for the purpose of decreasing overhead of the processing time, the program may be given in an execute form after compiled and encryption and decryption processing for obfuscation may be executed for the program in the execute form for circumventing the use of the emulator.

In the second exemplary embodiment described above, the obfuscation processing is performed for the whole of the program. However, for example, to decrease overhead of the processing time and an increase in the file size caused by the obfuscation, the obfuscation processing may be performed only for a part of the program.

In the exemplary embodiment described above, information concerning the program, such as the password is input of a one-way function or a pseudo one-way function or a part of the input and output of the one-way function or the pseudo one-way function or a part of the output is used for encryption of a part or all of the program code. Accordingly, a sturdy program obfuscation technique is provided.

Since the portion corresponding to the original program before obfuscated is encrypted using output of the one-way function or the pseudo one-way function or a part of the output, if the unauthorized user who does not have the authorized password attempts to execute the obfuscated program, the user cannot operate the program normally.

It is virtually impossible to perform inverse operation to important information concerning the program, such as the password from information concerning the obfuscated program because of the nature of the one-way function or the pseudo one-way function. Thus, unauthorized analysis of the program is prevented and the ownership right to the program is protected.

In the exemplary embodiment described above, to use the emulator for obfuscation, it is not necessary to encrypt a program in an execute form. Thus, the obfuscation apparatus also performs obfuscation processing holding high safety for software described in a language such as Java using readable intermediate code difficult to accomplish with a large number of related art techniques.

When encryption is executed, program code may be converted into a different code system from the program code system for use.

Figure 8:
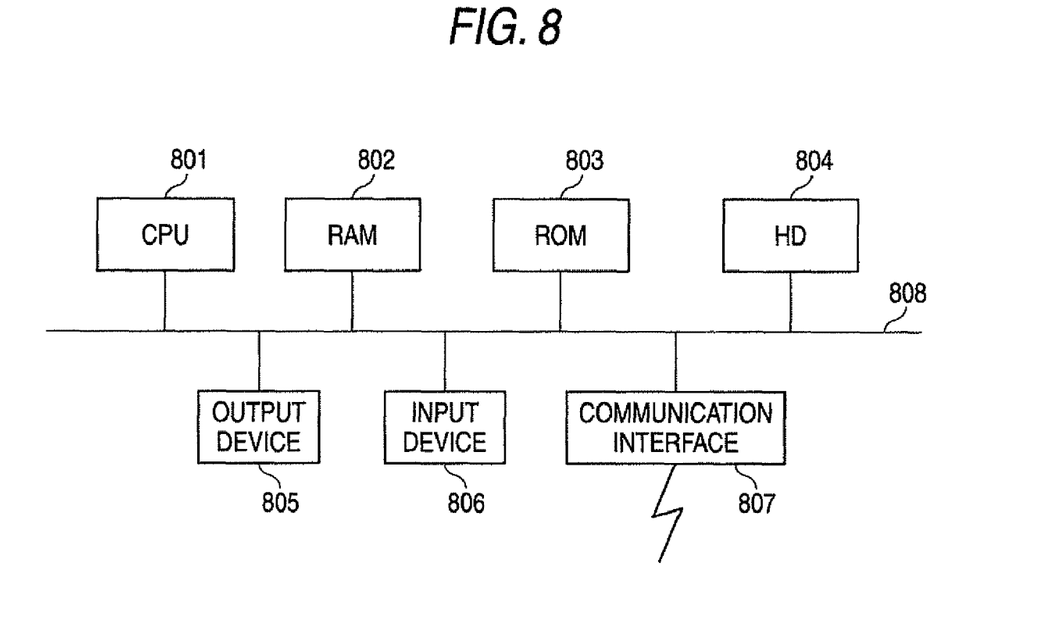
FIG. 8 is a block diagram to show a hardware configuration example of a computer for implementing the first and second exemplary embodiments of the invention.

The hardware configuration of a computer for executing a program as the first and second exemplary embodiments is a general computer as shown in FIG. 8; specifically it is a personal computer, a computer that can become a server, or the like. It is made up of a CPU 801 for executing the programs of the pseudo random number generation module 102, the encryption processing module 104, the decryption module 203, the execution module 204, etc., RAM 802 for storing the programs and data, ROM 803 storing a program for starting the computer and the like, an HD 804 of auxiliary storage (for example, a hard disk can be used), an input device 806 for entering data such as a keyboard or a mouse, an output device 805 of a CRT, a liquid crystal display, etc., a communication interface 807 for connecting to a communication network (for example, a network interface card can be used), and a bus 808 for connecting the components for transferring data. Two or more computers may be connected by a network.

For the part based on the computer program in the exemplary embodiments described above, the computer program of software is read into the system of the hardware configuration and the software and hardware resources work in cooperation, thereby implementing the exemplary embodiments described above.

The hardware configuration shown in FIG. 8 shows one configuration example and the exemplary embodiments are not limited to the configuration in FIG. 8 and any configuration may be adopted if it makes it possible to execute the modules described in the exemplary embodiments. For example, some modules may be implemented as dedicated hardware (for example, an ASIC, etc.,) and some modules may be included in an external system and may be connected via a communication line and further a plurality of systems shown in FIG. 8 may be connected via a communication line so as to operate in cooperation with each other. The system may be built in a home information appliance, a copier, a fax, a scanner, a printer, a multiple function processing machine (an image processing apparatus having functions of any two or more of a scanner, a printer, a copier, a fax, etc.,), etc., in addition to a personal computer.

The described program may be provided as it is stored on a record medium or the program may be provided by communication unit. In this case, for example, the described program may be grasped as the invention of a "computer-readable record medium recording a program."

The expression "computer-readable record medium recording a program" is used to mean a record medium read by a computer recording a program, used to install and execute a program, to distribute a program, etc.

The record media include "DVD-R, DVD-RW, DVD-RAM, etc.," of digital versatile disk (DVD) and standard laid down in DVD Forum, "DVD+R, DVD+RW, etc.," of standard laid down in DVD+RW, read-only memory (CD-ROM), CD recordable (CD-R), CD rewritable (CD-RW), etc., of compact disk (CD), magneto-optical disk, flexible disk (FD), magnetic tape, hard disk, read-only memory (ROM), electrically erasable and programmable read-only memory (EEPROM), flash memory, random access memory (RAM), etc., for example.

The described program or a part thereof may be recorded in any of the described record media for retention, distribution, etc. The described program or a part thereof may be transmitted by communications using a transmission medium such as a wired network used with a local area network, a metropolitan area network (MAN), a wide area network (WAN), the Internet, an intranet, an extranet, etc., or a wireless communication network or a combination thereof, etc., for example, and may be carried over a carrier wave.

Further, the described program may be a part of another program or may be recorded in a record medium together with a different program. It may be recorded as it is divided into a plurality of record media. It may be recorded in any mode if it can be restored, such as compression or encryption.

The exemplary embodiments have the following features. The following information processing apparatus may be understood each as an information processing program or an information processing method.

[A] An information processing apparatus includes an information acceptance unit, a calculation unit and an encryption unit. The information acceptance unit accepts information relevant to a program. The calculation unit calculates a one-way function or a pseudo one-way function using the information relevant to the program accepted by the information acceptance unit or a part of the information. And the encryption unit performs encryption processing for code of the program or the conversion result of the code or a part thereof using the calculation result of the calculation unit or a part of the result.

[B] According to the information processing apparatus of [A], to perform encryption processing by the encryption unit, exclusive OR between the calculation result of the calculation unit or a part of the result and the code of the program or the conversion result of the code or a part thereof is used.

[C] According to the information processing apparatus of [A] or [B], to perform encryption processing by the encryption unit, output of the one-way function or the pseudo one-way function or the conversion result of the output is used as a cipher key.

[D] According to the information processing apparatus of [A], [B] or [C], a password is used as the information relevant to the program.

[E] According to the information processing apparatus of [A], [B], [C] or [D], secret information of a random number sequence assigned to give an execution command of the program is used as the information relevant to the program.

[F] According to the information processing apparatus of [A], [B], [C], [D] or [E], the one-way function or the pseudo one-way function is formed using a hash function.

[G] According to the information processing apparatus of [A], [B], [C], [D], [E] or [F], the one-way function or the pseudo one-way function may be formed using permutation having one way or pseudo one way.

[H] According to the information processing apparatus of [A], [B], [C], [D], [E], [F] or [G], the code of the program undergoing encryption processing or the conversion result of the code is described using coding of the Godel number, etc.

[I] According to the information processing apparatus of [A], [B], [C], [D], [E], [F], [G] or [H], the program code is converted into a different code system from the program code system for use.

[J] An information processing apparatus includes an information acceptance unit, a calculation unit and a decryption unit. The information acceptance unit accepts information relevant to a program. The calculation unit calculates a one-way function or a pseudo one-way function using the information relevant to the program accepted by the information acceptance unit or a part of the information. And a decryption unit decrypts code of the program subjected to encryption processing or the conversion result of the code or a part thereof using the calculation result of the calculation unit or a part of the result.

[K] According to the information processing apparatus of [J], to perform decryption by the decryption unit, exclusive OR between the calculation result of the calculation unit or a part of the result and the code of the program or the conversion result of the code or a part thereof is used.

[L] According to the information processing apparatus of [J] or [K], to perform encryption processing for a part or all of the code of the program, output of the one-way function or the pseudo one-way function or the conversion result of the output is used as a cipher key.

[M] According to the information processing apparatus of [J], [K] or [L], a password is used as the information relevant to the program.

[N] According to the information processing apparatus of [J], [K], [L] or [M], secret information of a random number sequence assigned to give an execution command of the program is used as the information relevant to the program.

[O] According to the information processing apparatus of [J], [K], [L], [M] or [N], the one-way function or the pseudo one-way function is formed using a hash function.

[P] According to the information processing apparatus in [J] [K], [L], [M], [N] or [O], the one-way function or the pseudo one-way function is formed using permutation having one way or pseudo one way.

[Q] According to the information processing apparatus of [J], [K], [L], [M], [N], [O] or [P], the encrypted code of the program or the conversion result of the code is described using coding of the Godel number, etc.

[R] According to the information processing apparatus of [J], [K], [L], [M], [N], [O], [P] or [Q], the program code is converted into a different code system from the program code system for use.

[S] According to the information processing apparatus of [J], [K], [L], [M], [N], [O], [P], [Q] or [R ], the information processing apparatus further includes a decryption unit that decrypts the encrypted object code The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor information acceptance unit that accepts a credential of a program;
   a processor calculation unit that calculates a calculation result of one of a one-way function and a pseudo one-way function by combining the credential accepted by the information acceptance unit with a pseudo-random number to obtain a combined information and using the combined information as an input for the one of the one-way function and the pseudo one-way function;
   a process encryption unit that encrypts at least one of (i) at least a part of a code of the program, and (ii) at least a part of a conversion result of the code of the program, using at least a part of the calculation result; and
   a processor program addition unit that executes at least one of the code of the program encrypted by the encryption unit and at least a part of the conversion result of the code, wherein
   the code of the program is a source code of a program described by an interpreted language using intermediate code.

2. The information processing apparatus of claim 1, wherein
   the encryption unit encrypts both of at least the part of the code of the program and at least the part of the conversion result of the code of the program using at least the part of the calculation result calculated by the calculation unit.

3. The information processing apparatus of claim 1, wherein
   the credential is a symmetric key, and
   a copy of the symmetric key is embedded in a start program configured to execute at least one of (i) the code of the program encrypted by the encryption unit, and (ii) at least a part of the conversion result of the code, using the copy of the symmetric key.

4. An information processing apparatus comprising:
   a processor information acceptance unit that accepts a credential of a program;
   a processor calculation unit that calculates a calculation result of one of a one-way function and a pseudo one-way function by combining the credential accepted by the information acceptance unit with a pseudo-random number to obtain a combined information and using the combined information as an input for the one of the one-way function and the pseudo one-way function;
   a processor decryption unit that decrypts at least one of (i) at least a part of a code of the program subjected to encryption processing, and (ii) at least a part of a conversion result of the code of the program, using at least a part of the calculation result;
   a processor execution unit that executes at least one of the code of the program decrypted by the decryption unit and the conversion result of the code and a part thereof,
   wherein the code of the program decrypted by the decryption unit is a source code of a program described by an interpreted language using intermediate code.

5. The information processing apparatus of claim 4, wherein
   the decryption unit decrypts both of at least the part of the code of the program subjected to encryption processing and at least the part of the conversion result of the code of the program using at least the part of the calculation result calculated by the calculation unit.

6. A non-transitory computer readable medium storing a program causing a computer with a hardware processor to execute a process for protecting software, the process comprising:
   accepting a credential of a program;
   calculating a calculation result of one of a one-way function and a pseudo one-way function by combining the accepted credential with a pseudo-random number to obtain a combined information and using the combined information as an input for the one of the one-way function and the pseudo one-way function;
   encrypting at least one of (i) at least a part of a code of the program, and (ii) at least a part of a conversion result of the code of the program, using at least a part of the calculation result; and
   executing at least one of the code of the program encrypted by the encrypting step and at least a part of the conversion result of the code, wherein
   the code of the program is a source code of a program described by an interpreted language using intermediate code.

7. The non-transitory computer readable medium of claim 6, the process further comprising:

encrypting both of at least the part of the code of the program and at least the part of the conversion result of the code of the program using at least the part of the calculation result.

8. The non-transitory computer readable medium of claim 6, wherein
the credential is a symmetric key, and
a copy of the symmetric key is embedded in a start program configured to execute at least one of (i) the code of the program encrypted by the encryption unit, and (ii) at least a part of the conversion result of the code, using the copy of the symmetric key.

9. A non-transitory computer readable medium storing a program causing a computer with a hardware processor to execute a process for protecting software, the process comprising:
accepting a credential of a program;
calculating a calculation result a one-way function or a pseudo one-way function by combining the accepted credential with a pseudo-random number to obtain a combined information and using the combined information as an input for the one of the one-way function and the pseudo one-way function;
decrypting at least one of (i) at least a part of a code of the program subjected to encryption processing, and (ii) at least a part of a conversion result of the code of the program, using at least a part of the calculation result; and
executing at least one of the code of the program decrypted by the decrypting step and the conversion result of the code and a part thereof, wherein
the code of the program decrypted by the decrypting step is a source code of a program described by an interpreted language using intermediate code.

10. The non-transitory computer readable medium of claim 9, the process further comprising:
decrypting both of at least the part of a code of the program subjected to encryption processing and at least the part of a conversion result of the code of the program using at least the part of the calculation result.

* * * * *